(12) United States Patent
Ferderer

(10) Patent No.: US 7,407,613 B2
(45) Date of Patent: Aug. 5, 2008

(54) METHOD FOR MANUFACTURING A LOCKING DEVICE AS WELL AS LOCKING DEVICE FOR AN ELECTRIC CONTACT IN A PLUG-TYPE CONNECTOR

(75) Inventor: Albert Ferderer, Espelkamp (DE)

(73) Assignee: Harting Electric GmbH & Co. KG (DE)

( * ) Notice: Subject to any disclaimer, the term of this patent is extended or adjusted under 35 U.S.C. 154(b) by 0 days.

(21) Appl. No.: 11/625,188

(22) Filed: Jan. 19, 2007

(65) Prior Publication Data
US 2007/0178741 A1    Aug. 2, 2007

(30) Foreign Application Priority Data
Feb. 2, 2006    (DE)    .................. 10 2006 004 782

(51) Int. Cl.
*A63B 37/00* (2006.01)
(52) U.S. Cl. .................................................. 264/279.1
(58) Field of Classification Search ................ 439/595, 439/736; 264/279, 279.1, 328.1, 334, 318; 425/577; 249/64, 63; 624/279, 279.1, 328.1, 624/334
See application file for complete search history.

(56) References Cited

U.S. PATENT DOCUMENTS

| | | | | | |
|---|---|---|---|---|---|
| 3,148,701 | A | * | 9/1964 | Bagwell | 137/556 |
| 4,348,348 | A | * | 9/1982 | Bennett et al. | 264/255 |
| 4,358,179 | A | * | 11/1982 | Bourdon et al. | 439/595 |
| 5,008,058 | A | * | 4/1991 | Henneberger et al. | 264/134 |
| 5,067,913 | A | | 11/1991 | Sagawa | 439/595 |
| 6,679,729 | B2 | * | 1/2004 | Tanaka et al. | 439/595 |

FOREIGN PATENT DOCUMENTS

| | | |
|---|---|---|
| DE | 1515831 | 11/1969 |
| DE | 196 31 467 | 2/1998 |

* cited by examiner

*Primary Examiner*—Phuong K Dinh
(74) *Attorney, Agent, or Firm*—Hayes Soloway P.C.

(57) ABSTRACT

In order to interlock an electric contact within an insulating body for a plug-type connector, the invention provides integral clips that are axially spaced apart from one another and on the edges of which the electric contact can be interlocked within a through-opening on the mating side and on the connection side. The invention also proposes a method in which two mould cores that encompass one another and form the through-opening can be removed from the through-opening in opposite directions after the injection-moulding process.

2 Claims, 4 Drawing Sheets

METHOD FOR MANUFACTURING A LOCKING DEVICE AS WELL AS LOCKING DEVICE FOR AN ELECTRIC CONTACT IN A PLUG-TYPE CONNECTOR

BACKGROUND OF THE INVENTION

1. Field of the Invention

The invention pertains to a method for manufacturing a locking device for an electric contact in a through-opening and an adjacent insertion compartment in an insulating body by means of an injection-moulding tool for a plug-type connector as well as to a locking device for an electric contact in a through-opening and an adjacent insertion compartment in an insulating body.

2. Description of the Related Art

A locking device of this type is required for holding an electric contact in the opening of an insulating body in a captive fashion.

It is common practice to fix known electric contacts that are usually realized in the form of crimp contacts and arranged within an insulating body in a captive fashion by means of corresponding locking means (e.g., a locking clip).

For example, DE 15 15 831 discloses a device for holding exchangeable contact elements in electric plug-type connectors, wherein a locking cone secures the contact element in an insulating body.

In this system, it is disadvantageous that at least one additional locking means in the form of a snap ring, a locking ring or a snap hook is required in order to fix the electric contacts in position.

SUMMARY OF THE INVENTION

The invention consequently is based on the objective of developing a device that makes it possible to simply lock an electric contact in a through-opening of an insulating body without auxiliary means.

This objective is initially attained with a method in which two mould cores, namely a first mould core and a second mould core, partially encompass one another and are arranged within an injection-moulding tool that forms a housing, wherein said mould cores can be respectively removed from the through-opening in axially opposite directions after the injection-moulding process, and wherein the mould cores are shaped such that clip-on means featuring clip-on edges are formed on both ends of the through-opening.

The aforementioned objective is also attained in that the through-opening respectively features a clip-on means that protrudes into the interior on both ends, wherein the clip-on means are arranged offset relative to one another by 180°, and wherein the electric contact can be interlocked within the regions of the clip-on means that are axially spaced apart from one another.

The advantages attained with the invention can be seen, in particular, in that a conventional electric contact realized in the form of a pin or a socket contact can be directly interlocked in the inventive embodiment of the insulating body without requiring an additional separate holding or locking element.

In contrast to known arrangements, it is advantageous to fix the contact in a through-opening that accommodates the contact on both sides, namely with correspondingly designed clip-on means.

For this purpose, a stop pin is provided on one side of the through-opening and a locking block is provided on the other side, wherein the contact can be inserted and interlocked between the stop pin and the locking block. During this process, a circumferential groove arranged on the electric contact engages with an undercut on the locking block that is provided with a clip-on edge.

The locking block features a clip-on edge with an angle of 90° while the adjacent angle of the clip-on edge of the electric contact forms an angle between 80° and 85°, preferably 83°, relative to the groove plane.

The advantage in comparison with a conventional 90°-angle can be seen in that the locking block is integrally arranged on an exposed overhang of the wall of the through-opening and the overhang may be bent radially outward while the contact is subjected to a load during the mating process such that there is a risk of the contact sliding out of the locking region.

In the preferred embodiment, the steeper slope of the clip-on edge of the contact engages on the clip-on edge of the locking block.

During the removal of the electric contact from the through-opening, this bending effect is preferably utilized in the form of an extreme excursion of the overhang.

For this purpose, a disassembly tool is inserted between the crimping region of the electric contact and the slope realized on the locking block. The overhang can then be displaced radially outward until the contact is exposed and can be pulled out with the cable crimped thereon. In this respect, the option of providing locking elements on two sides could not be considered until now because a corresponding tool for producing openings and clip-on means of this type was not available.

A simple and inexpensive interlock between electric contacts and a connector housing can be produced with one advantageous development of this method, in which two mould cores that at least regionally interpenetrate are used for moulding the through-opening and the clip-on means.

BRIEF DESCRIPTION OF THE DRAWINGS

One embodiment of the invention is illustrated in the figures and described in greater detail below. The figures show.

DESCRIPTION OF THE PREFERRED EMBODIMENTS

Figure 1B:
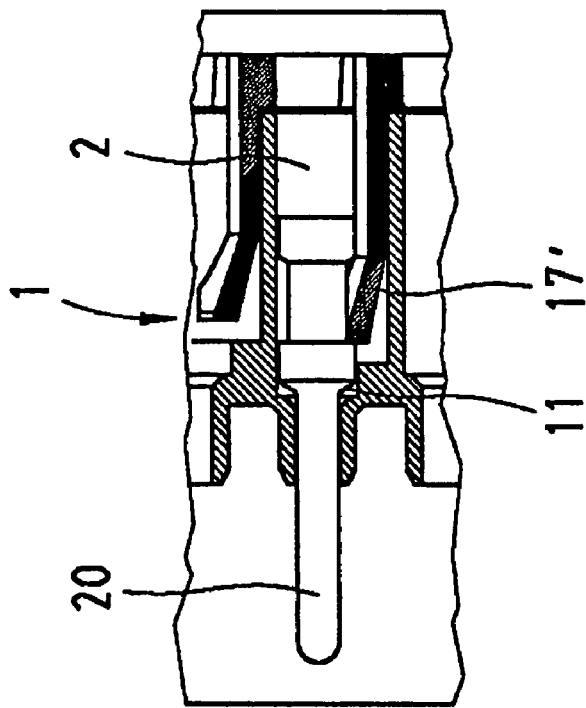
FIGS. 1a and 1b are mounting techniques according to the state of the art.
Figure 1A:
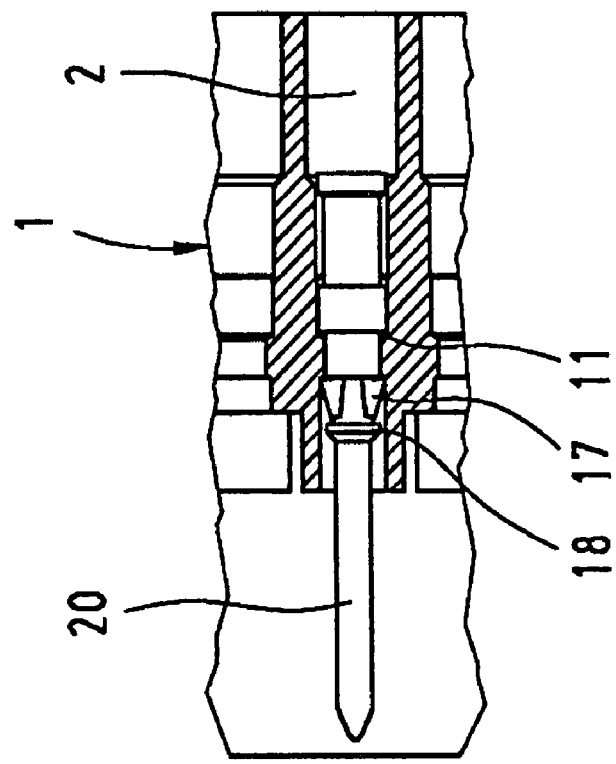

FIGS. 1a, 1b show the current state of the art for locking electric contacts in connector housings. FIG. 1a shows a longitudinal section through an insulating body 1 with a contact 20 that is inserted into an opening 2 in the mating direction, namely against a clip-on edge 11, and locked in position by means of a locking element 17 that is attached from the mating direction and abuts the stop 11 on the opposite side. In this case, the locking element is realized in the form of a sleeve-shaped washer that is supported on a collar 18 of the contact and fixes the contact in the opening.

FIG. 1b also shows an electric contact 20 that is inserted into an opening 2 against a clip-on edge 11 in the mating direction. The contact 20 is locked in position by means of a locking element 17' that is realized in the form of a clip-on arm, wherein said locking element also acts upon a collar of the contact in the mating direction and thusly fixes the contact in the opening 2.

Figure 2:
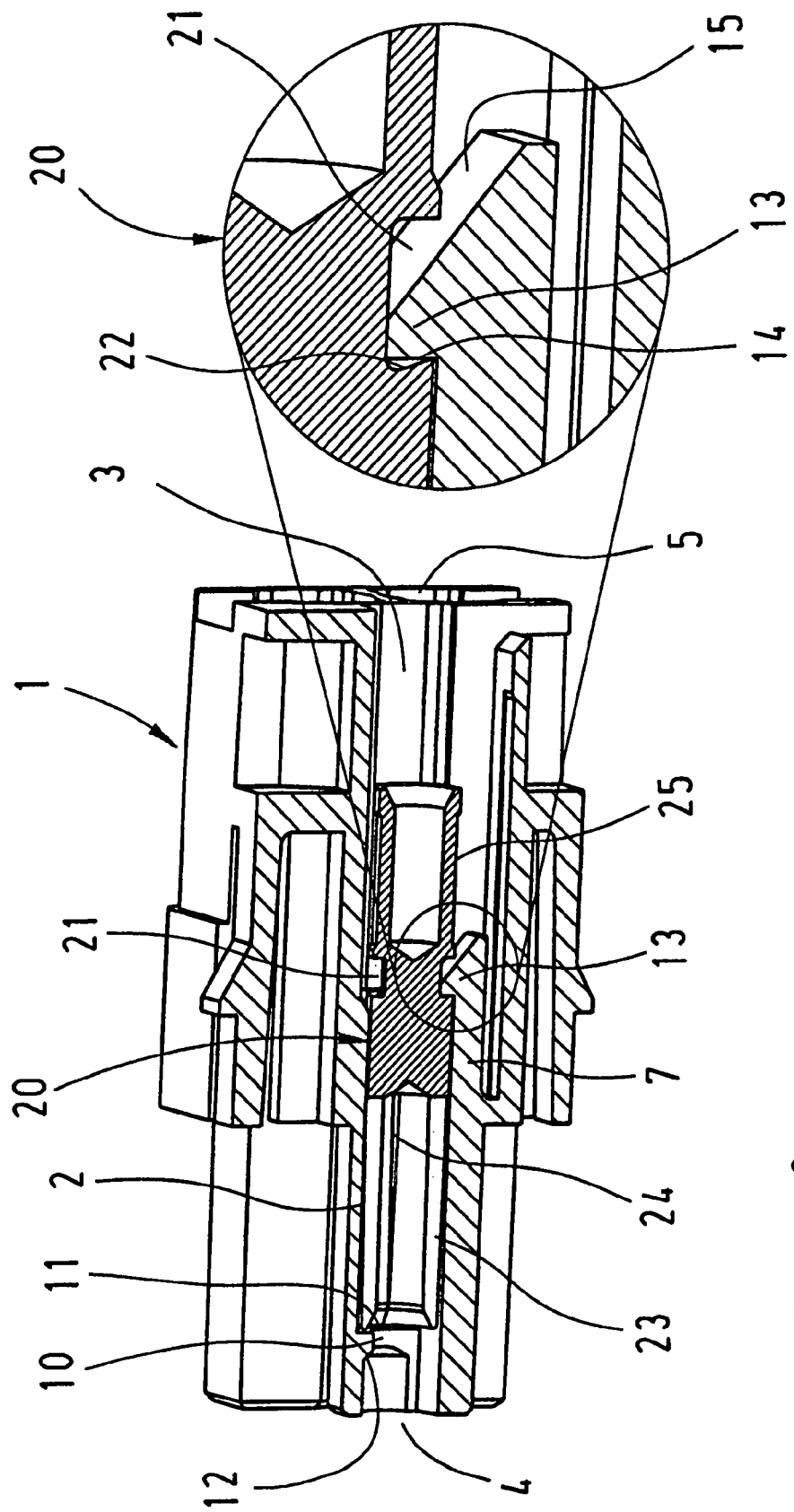
FIG. 2 a longitudinal section through an insulating body with an electric contact, FIG. 3 a longitudinal section through an insulating body with an electric contact and an electric cable, as well as a disassembly tool, and FIG. 4 a longitudinal section through an insulating body with mould cores.

FIG. 2 shows a longitudinal section through an insulating body 1 with an electric contact 20 that is inserted into a through-opening 2 and realized in the form of a socket in this case, wherein said contact features a contact zone 23 that is provided with several longitudinal slots 24, as well as a crimping region 25 that is separated from said contact zone by a circumferential groove 21.

The electric contact 20 is fixed on both sides with hook-shaped clip-on means that form an integral part of the ends of the through-opening 2.

The clip-on means are realized in the form of a U-shaped stopping bow 10 on the mating side 4 of the circular through-opening 2, as well as in the form of a locking block 13 on the opposite connection side 5.

In this respect, the invention proposes to arrange the two clip-on means 10, 13 that only protrude into the through-opening regionally such that they are radially offset by approximately 180°.

This means that the contact 20 is securely fixed in position, namely even if the stopping bow 10 is not realized completely circular within the through-opening 2 and the locking block 13 has approximately half the width of a through-opening.

The stopping bow is shaped such that it extends from an upper maximum extension protruding into the interior to the lower part of the through-opening, namely in a symmetric fashion on both sides, and then ends in the wall without a transition.

When the contact is inserted into the through-opening 2 in the mating direction 4, in this case from the left to the right, the end on the mating side adjoins the "upper" left clip-on edge 11 of the front stopping bow 10 while the hook-shaped "lower" right locking block 13 penetrates into the circumferential groove 21 of the electric contact 20. The locking block furthermore features a slope 15, the function of which is explained further below.

The circumferential groove 21 of the contact has the peculiar feature that at least the clip-on edge of the undercut 22 that acts upon the locking block is angled relative to the base surface of the groove by an angle between 80° and 85°, preferably 83.5°.

When the electric contact 20 is subjected to an axial load, i.e., when a connection is produced with a mating connector, this provides the advantage that the load is transmitted to the locking block 13. Since the locking block is arranged on the overhang 7, there is a certain risk of moving the locking block such that the contact slides out of the through-opening.

Due to the steeper angle, the undercut 22 is wedged against the lower end of the clip-on edge 14 and largely prevents the overhang 7 from moving.

An insertion compartment 3 situated adjacent to the locking block 13 accommodates, among other things, the crimping zone of the electric contact with the corresponding electric cable and has larger dimensions than the through-opening 2; these larger dimensions not only serve for accommodating a disassembly tool 40 in addition to the electric conductor 27, but also for realizing part of the wall of the through-opening 2 in the form of an exposed overhang 7.

Figure 3:
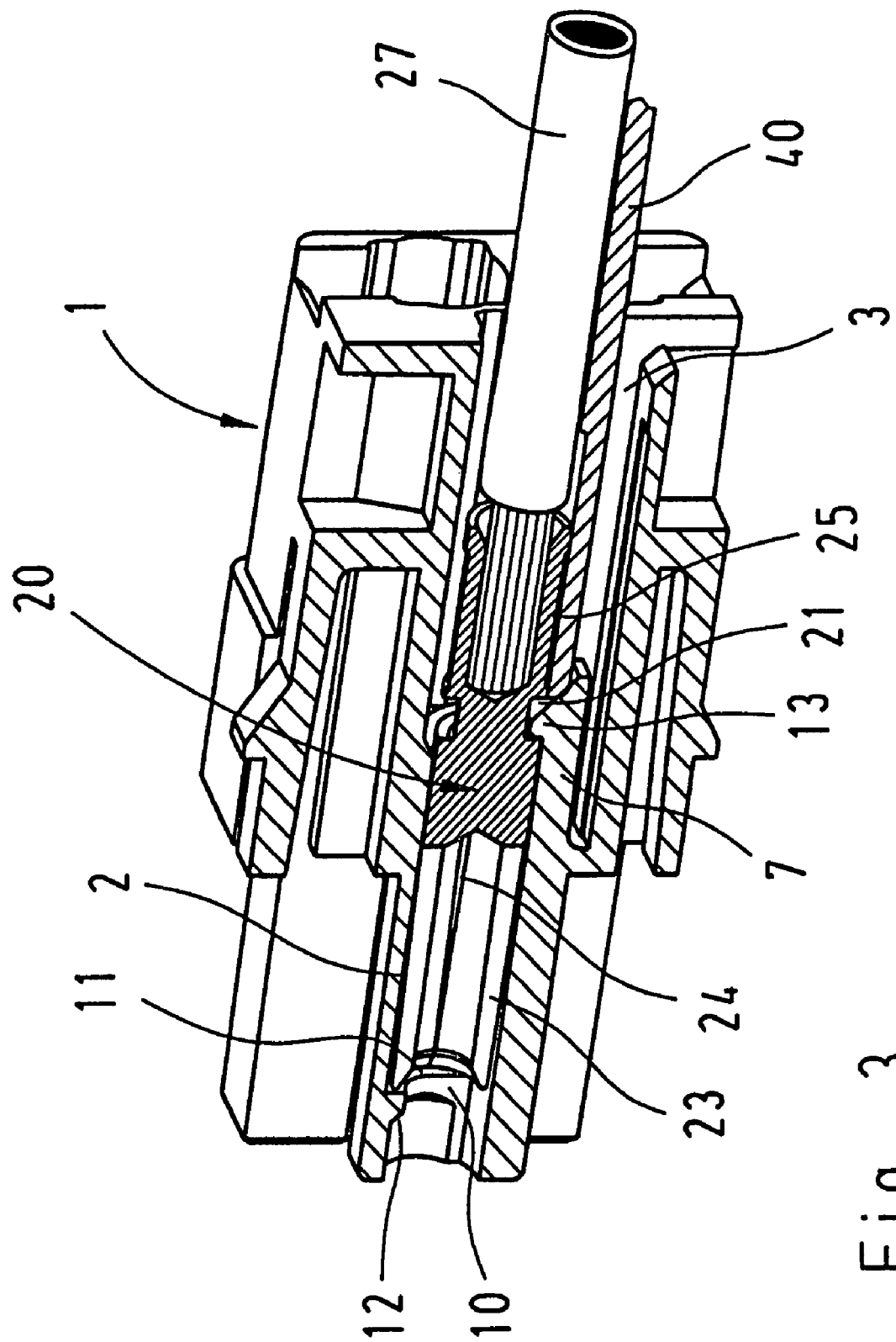

If the disassembly tool 40 is inserted between the slope 15 of the locking block 13 and the crimping zone 25 of the contact 20 as shown in FIG. 3, the locking block is pressed down due to the exposed overhang 7. The resulting lever effect causes the point of the hook-shaped locking block 13 to disengage from the circumferential groove 21 of electric contact 20 and the contact 20 can be pulled out of the through-opening 2 with the cable 27 already crimped thereon.

Figure 4:
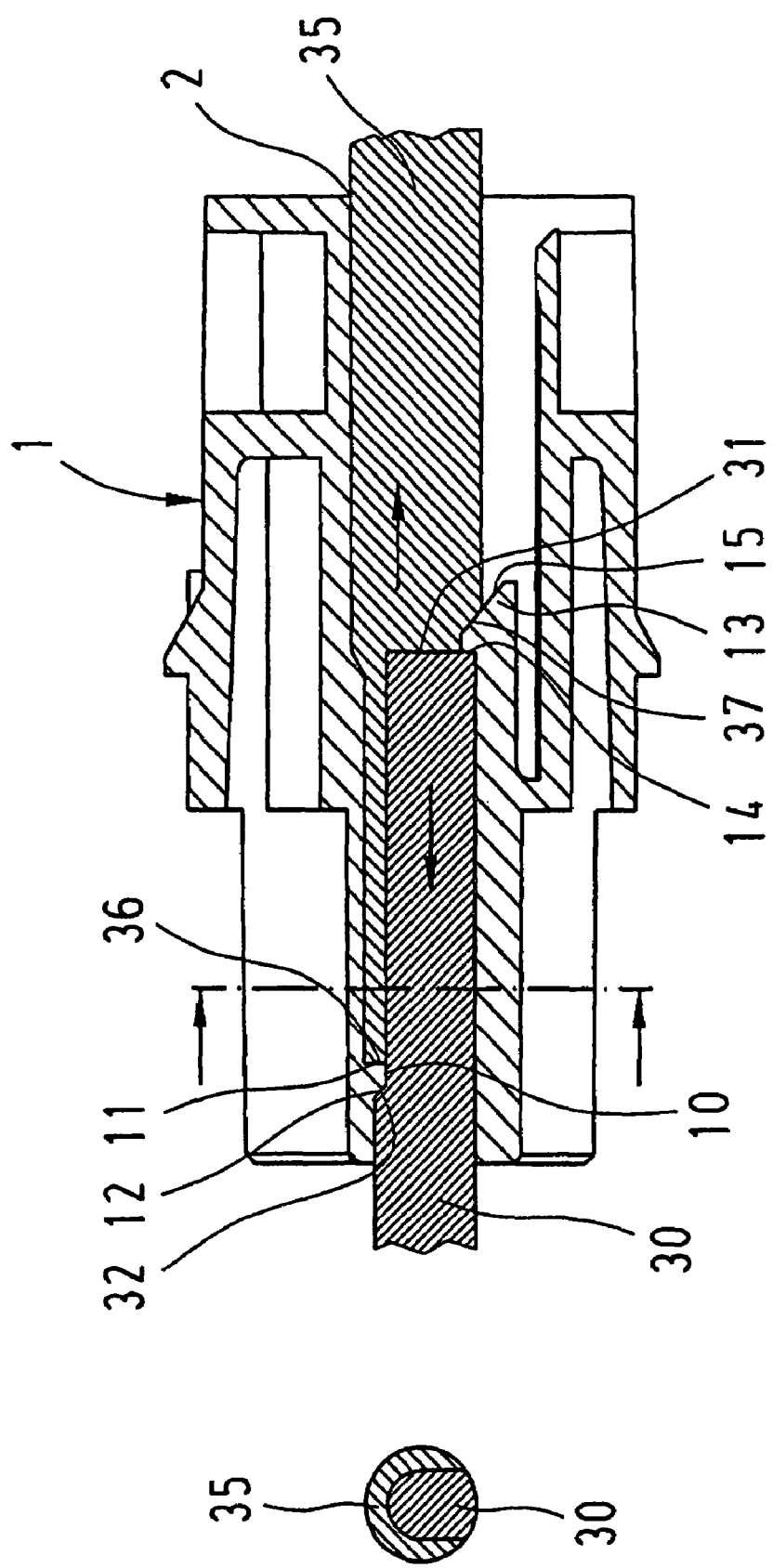

The simplified schematic representation according to FIG. 4 shows the shape of the two clip-on means 10, 13 for interlocking the electric contact 20 in the through-opening 2 of the insulating body.

In this case, the insulating body 1 with the through-opening 2 and the merely indicated mould cores 30, 35 is illustrated in the form of a longitudinal section at the time at which the plastic mass injection-moulded thereon has cooled.

The two mould cores 30, 35 have different shapes, wherein a nearly oval inner core 30 is at least regionally encompassed by a U-shaped outer core 35 such that the two oppositely arranged mould cores form an approximately circular through-opening 2.

In this case, the front sides 31, 36 of the mould cores 30, 35 form the two clip-on edges of the clip-on means, wherein the front side 31 forms the "rear" clip-on edge 14 on the locking block 13 and the front side 36 forms the front clip-on edge 11 on the stopping bow 10.

The integral elements 32 and 37 of the mould cores serve for producing the slopes 12 on the stopping bow 10 and the slope 15 on the locking block 13 during the injection-moulding process.

Since the core 35 is designed such that it encompasses the oval core 30, the stopping bow 10 can transform into the lateral region of the inner wall from its maximum spacing without a transition.

After the injection-moulding process, the two cores are removed from the through-opening in directions that are offset by 180°.

What is claimed is:

1. A method for manufacturing a locking device for an electric contact in a through-opening with two ends, namely a mating side and a connection side, an adjacent insertion compartment in an insulating body of a connector housing using an injection-moulding tool for a plug-type connector,
   wherein the through-opening in the insulating body is realized via two mould cores that partially encompass one another, namely a first mould core and a second mould core that are arranged within the injection-moulding tool forming the housing, wherein the two mould cores can be respectively removed from the through-opening in axially opposite directions after the injection-moulding of the insulating body, and wherein the mould cores are shaped such that clips featuring clip-on edges are formed on the two ends of the through-opening,
   wherein the first mould core has a roughly oval shape, and in that the second mould core is realized in the form of a U-shaped sleeve that can be pushed on and essentially encompasses the first mould core on three side.

2. A method for manufacturing a locking device for an electric contact in a through-opening with two ends, namely a mating side and a connection side, an adjacent insertion compartment in an insulating body of a connector housing using an injection-moulding tool for a plug-type connector,
   wherein the through-opening in the insulating body is realized via two mould cores that partially encompass one another, namely a first mould core and a second mould core that are arranged within the injection-moulding tool forming the housing, wherein the two mould cores can be respectively removed from the through-opening in axially opposite directions after the injection-moulding of the insulating body, and wherein the mould cores are shaped such that clips featuring clip-on edges are formed on the two ends of the through-opening,
   wherein the mould cores are shaped such that they form slopes on the one end of the through-opening as a stopping bow and on the other end as a locking block.

* * * * *